United States Patent [19]

Henniger

[11] Patent Number: 4,787,657
[45] Date of Patent: Nov. 29, 1988

[54] SCREW COUPLING

[75] Inventor: Dieter Henniger, Schalksmühle, Fed. Rep. of Germany

[73] Assignee: Hermann Kleinhuis GmbH & Co. KG., Lüdenscheid, Fed. Rep. of Germany

[21] Appl. No.: 913,736

[22] Filed: Sep. 30, 1986

[30] Foreign Application Priority Data

Oct. 5, 1985 [DE] Fed. Rep. of Germany ....... 3535595

[51] Int. Cl.$^4$ .............................................. F16L 5/00
[52] U.S. Cl. .................................... 285/323; 285/158; 174/65 SS
[58] Field of Search ............... 285/322, 323, 341, 342, 285/343; 174/65 G, 65 SS

[56] References Cited

U.S. PATENT DOCUMENTS

| 4,250,348 | 2/1981 | Kitogawa | 174/65 SS |
| 4,350,840 | 9/1982 | Michaels | 285/343 X |
| 4,600,803 | 7/1986 | Holzmann | 285/343 X |

FOREIGN PATENT DOCUMENTS

| 2132951 | 9/1977 | Fed. Rep. of Germany . | |
| 2754055 | 4/1979 | Fed. Rep. of Germany | 285/322 |
| 2631996 | 2/1984 | Fed. Rep. of Germany . | |
| 8415525 | 10/1984 | Fed. Rep. of Germany . | |

Primary Examiner—Dave W. Arola
Attorney, Agent, or Firm—Peter K. Kontler

[57] ABSTRACT

A screw coupling which can be applied to surround a cable, a hose, a conduit or a conductor has a nipple with an externally threaded section adjacent an end section with axially parallel prongs whose width decreases in a direction away from the first section toward an end face of the end section. Those end portions of alternate prongs which are adjacent the end face are enlarged in the circumferential direction of the nipple to engage a cable or the like when the prongs are flexed toward the axis of the nipple by a cap nut a first portion of which mates with the first section of the nipple and a second portion of which flexes the prongs toward the axis of the nipple. The remaining prongs have enlarged portions which are remote from the end face and can form a ring in response to predetermined flexing of the prongs, the same as the enlarged end portions of the alternate prongs. An elastic cylindrical seal is or can be inserted into the end section of the nipple to sealingly engage a conduit, a hose, a conductor or a cable which is surrounded by the nipple when the nut is applied with requisite force to flex the prongs relative to the first section of the nipple.

21 Claims, 2 Drawing Sheets

SCREW COUPLING

BACKGROUND OF THE INVENTION

The present invention relates to screw couplings in general, and more particularly to improvements in couplings of the type wherein an externally threaded tubular member (hereinafter called nipple for short) cooperates with a nut to clamp and/or otherwise engage an elongated conductor, a cable, a hose, a conduit or an analogous body in order to hold the body against axial movement and/or to prevent leakage of a fluid medium around the confined portion of the body.

It is already known to provide the nipple of a screw coupling with axially parallel flexible prongs or tongues which are flexed inwardly toward the axis of the nipple when the nut is rotated in a direction to be threaded onto the nipple. The inwardly flexed prongs thereby bear against the confined portion of the body or against a sealing element which is interposed between the body and the nipple. Reference may be had, for example, to German Pat. No. 2,132,951 which discloses a nipple adapted to extend through a wall and to surround a conduit and/or an electric cable. The nipple mates with a nut serving to deform a plastic sealing insert which has axially extending straight slots and can be deformed in response to application of the nut so that the insert is held in liquid- and gas-tight sealing engagement with the external surface of the tube or conductor which extends through the nipple. The slots enable the prongs of the insert to overlap each other in fanwise fashion in response to proper threading of the nut onto the nipple.

German Pat. No. 2,631,996 discloses a modified plastic screw coupling wherein the prongs include tooth-shaped portions and can partially overlap each other. The tooth-shaped portions are engaged by helical internal teeth of the nut to prevent undesirable axial displacements of the nut and nipple relative to each other. The internal teeth are intended to move the free end portions of the prongs radially inwardly one after the other whereby the prongs partially overlap each other and the internal teeth of the nut move into engagement with the tooth-shaped portions of the prongs.

A further screw coupling is disclosed in German Utility Model No. 8,415,525 and serves to engage a cable which passes through the nipple. The prongs of the nipple form a ring, and at least one prong is configurated in such a way that it moves radially inwardly in response to application of the nut to thereby establish a non-circular engagement between the annulus of prongs and the confined cable. The one prong has mutually inclined surfaces which cause it to move radially inwardly beyond the neighboring prongs in response to threading of the nut onto the nipple. The prongs deform a sealing element, which surrounds the cable, in such a way that the region of contact between the sealing element and the annulus of prongs has a non-circular outline.

OBJECTS AND SUMMARY OF THE INVENTION

An object of the invention is to provide a novel and improved screw coupling which can be made of a plastic material at a reasonable cost and ensures the establishment of an optimum connection between the nipple and/or a sealing element and the confined body, such as a cable, a hose, a conductor or a conduit.

Another object of the invention is to provide a screw coupling wherein the nipple cooperates with the nut in a novel and improved way.

A further object of the invention is to provide a novel and improved nipple for use in the above outlined screw coupling.

An additional object of the invention is to provide the nipple with novel and improved prongs.

Still another object of the invention is to provide a screw coupling which is compact, simple and inexpensive in spite of its reliability and versatility.

Another object of the invention is to provide a screw coupling which can be designed to properly engage, seal, hold and/or relieve stresses upon a wide variety of elongated bodies of different diameters.

A further object of the invention is to provide a screw coupling which is constructed and assembled in such a way that the flexing of prongs on the nipple is automatically terminated when further flexing could cause damage to the confined body and/or to the coupling.

Another object of the invention is to provide a novel and improved method of clamping or otherwise reliably engaging an elongated cable, conductor, conduit or an analogous body for the purpose of relieving the body of excessive axial and/or other stresses, of properly sealing the body and/or of properly holding the body in a selected axial position while permitting rapid and convenient disassembly of the coupling with available tools.

A further object of the invention is to provide a connection for cables or the like which employs a screw coupling of the above outlined character.

The improved screw coupling can be used to surround cables, hoses, conduits, conductors and like elongated bodies and comprises a nipple including an externally threaded first annular section and a second annular section which is adjacent the first section and has an end face remote from the first section. The second section includes a plurality of flexible prongs having first end portions adjacent the first section and second end portions at the end face. The second section is formed with slots which alternate with the prongs and the width of the prongs (as measured circumferentially of the second section) decreases in a direction from the first section toward the end face. The prongs include a set of prongs with enlarged second end portions extending circumferentially of the second section and transversely of the neighboring slots. The improved screw coupling further comprises a nut having a first annular portion which serves to mate with the first section and a second annular portion which serves to flex the prongs and to thereby move at least the second end portions of the prongs nearer to the axis of the second section in response to rotation of the nut in a direction to thread the first annular portion onto the first section of the nipple.

The screw coupling preferably further comprises a substantially tubular deformable sealing element which is receivable within the confines of the second section of the nipple and undergoes deformation in response to flexing of the prongs toward the axis of the second section.

The enlarged second end portion of each prong of the aforementioned set of prongs preferably extends transversely of and across both slots which flank the respective prong. The enlarged second end portion of each prong of the aforementioned set is preferably configurated in such a way that it comprises two mirror symmetrical halves.

The prongs preferably further include a group of prongs which alternate with the prongs of the aforementioned set. The configuration of the slots between neighboring prongs is preferably such that the lateral surfaces which flank the slots abut each other in response to a predetermined maximum flexing of the prongs toward the axis of the second section of the nipple. The prongs of the group are preferably provided with enlarged portions which are remote from the end face of the second section and extend circumferentially of the second section and transversely of the slots. The second section can comprise an even number of prongs, i.e., a predetermined number of prongs which form the set and an equal number of prongs which form the group so that each prong which has an enlarged second end portion is disposed between two prongs which have enlarged portions remote from the end face and vice versa.

The enlarged portions of the prongs which form the group are preferably arcuate in the circumferential direction of the second section of the nipple and preferably form a ring in response to sufficient flexing of the prongs toward the axis of the second section. The same preferably applies for the enlarged second end portions of those prongs which form the set.

The prongs which form the group can be provided with projections which extend substantially radially inwardly and form a circle with the enlarged second end portions of those prongs which form the set. Each projection has (or can have) a substantially triangular cross-sectional outline with an apex which is nearest to the axis of the second section of the nipple.

The first section of the nipple and the first annular portion of the nut can be formed with buttress threads if the screw coupling is to withstand pronounced axial stresses, e.g., in order to oppose extraction of a cable, cord, rope, hose, conduit or conductor from the interior of the nipple. At least the nipple of the improved screw coupling can consist of or contain a plastic material, e.g., a synthetic plastic substance which is a thermal and/or electrical insulator and/or exhibits other desirable properties in connection with the sealing and retention of, and/or the relaxation of axial and/or other stresses upon, the body which extends into and/or through the nipple.

The nipple can be provided with a collar adjacent the first annular section and remote from the second annular section to facilitate rotation of the nipple by a wrench or by any other suitable torque transmitting tool in order to drive the nipple into a wall or to separate the nipple from the nut. The nut can be provided with an analogous collar.

The enlarged second end portions of the prongs which form the set (as well as the enlarged portions of the prongs which form the group) are disposed radially inwardly of the neighboring slots so as not to interfere with flexing of the prongs and with the resulting narrowing of the slots in a direction from the first section toward the end face.

The novel features which are considered as characteristic of the invention are set forth in particular in the appended claims. The improved screw coupling itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
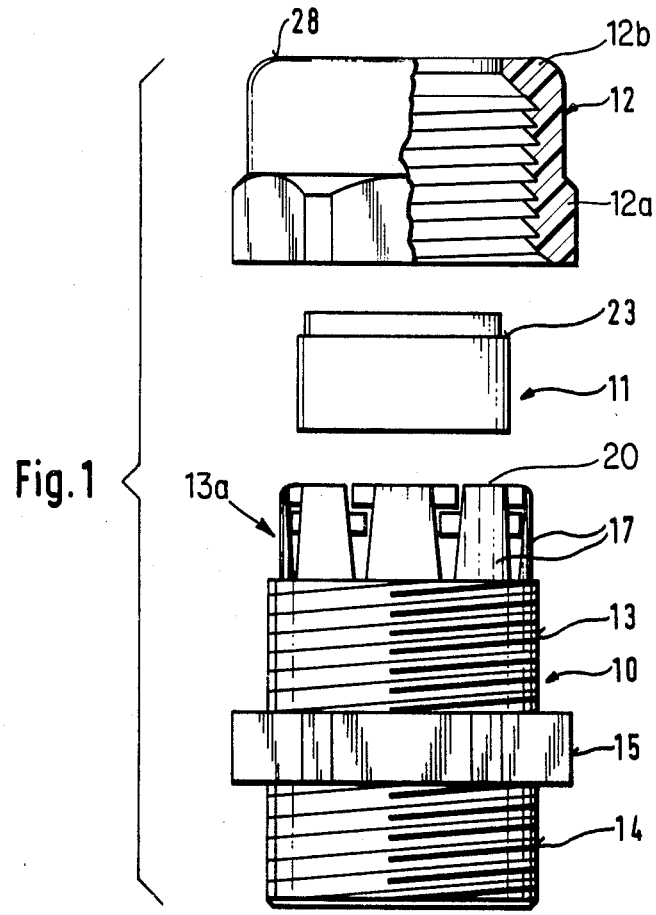
FIG. 1 is an exploded view of a screw coupling which embodies one form of the invention, a portion of the nut being broken away.

The improved screw coupling is preferably made of a plastic material whose characteristics depend on the desired function of the coupling. The latter can be used to clamp and hold an elongated cable, hose, conduit or conductor against axial movement, to maintain end-to-end two cables, hoses, conductors or conduits (hereinafter called cables for short with the understanding, however, that the coupling can be used with equal advantage in connection with many other elongated bodies), to sealingly surround a cable and/or to relieve axial stresses upon a cable which extends into and/or through a tubular nipple 10 of the coupling. The coupling further comprises a cap nut 12 and can comprise a tubular (e.g., cylindrical) sealing element 11 which can be inserted into the nipple to be compressed against the peripheral surface of the cable. The sealing element 11 preferably consists of an elastomeric material which can undergo requisite deformation in response to deformation of an annular section 13a of the nipple 10. The illustrated nipple 10 is made of a single piece of plastic material, the same as the nut 12 and the sealing element 11. The diameter of the axial hole or passage 27 in the nipple 10 is selected in such a way that it allows for convenient insertion of a cable so that the cable extends through and beyond both ends of the nipple, that the cable extends into the nipple by way of one end of the hole 27 and its end portion is located in the interior of the nipple, or that the cable extends through the other end portion of the nipple and terminates in the interior of the nipple.

Figure 2:
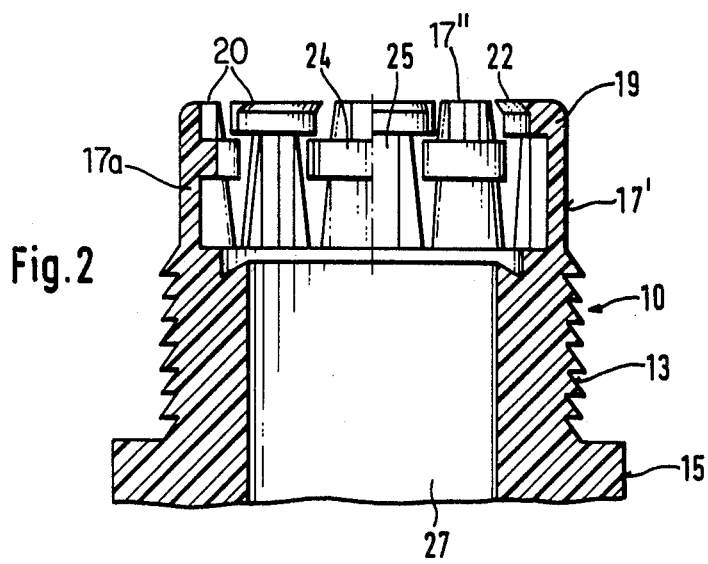
FIG. 2 is an enlarged fragmentary sectional view of the nipple in the screw coupling of FIG. 1, substantially in the direction of arrows from the line II—II of FIG. 1; a FIG. 3 is an exploded perspective view of a portion of a screw coupling wherein the nipple has a different external thread.
Figure 3:
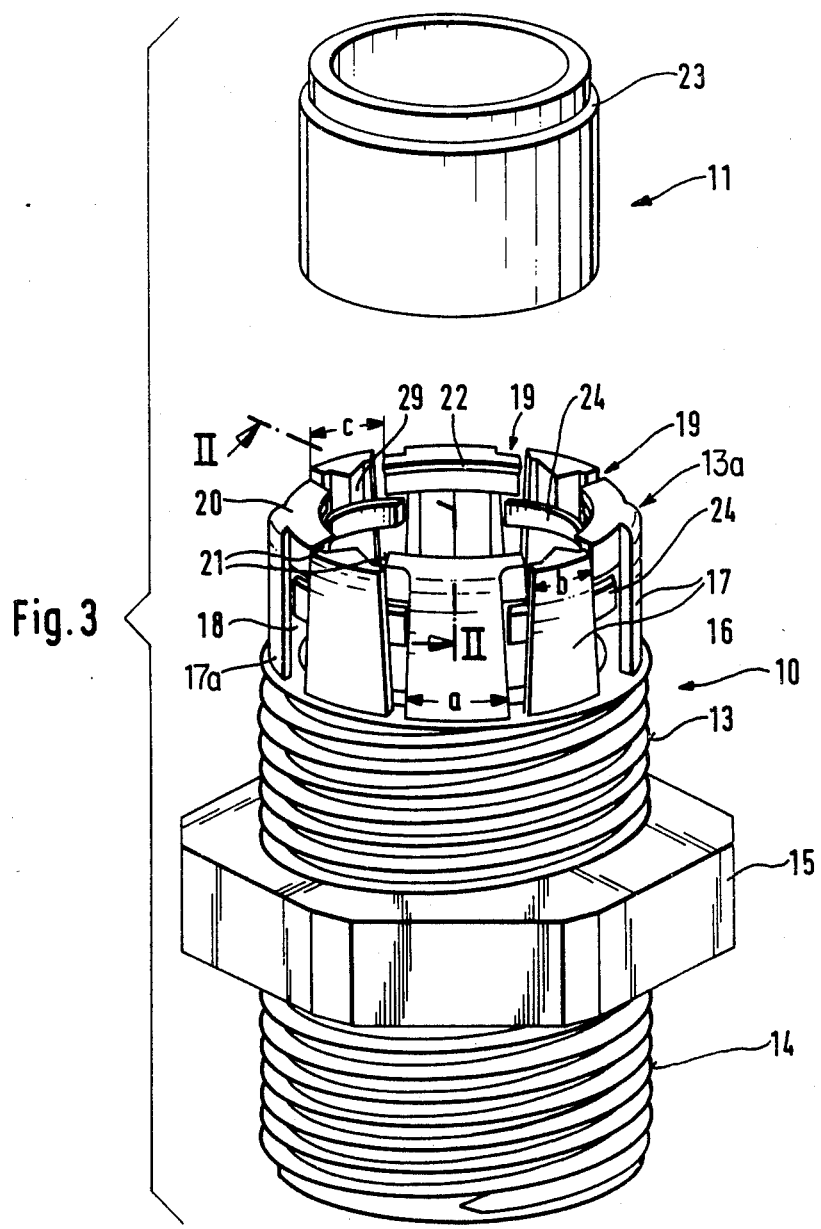

As can be seen in FIGS. 1–3, the nipple 10 has an externally threaded annular section 13 which is provided with buttress threads (see FIGS. 1–2) or with so-called Pg threads which are shown in FIG. 3 (depending on the resistance which the nipple and the nut 12 must exhibit to axial movement relative to each other). The aforementioned annular section 13a, which is adjacent one axial end of the annular section 13, has a substantially flat end face 20. The nipple 10 has another annular section 14 which is separated from the annular section 13 by a collar 15 having a non-circular (e.g., hexagonal) outline so that it can be readily engaged by a wrench or another suitable torque transmitting tool, not shown. The section 14 can be driven into a wall, and the section 13 can mate with the internally threaded first annular portion 12a of the nut 12.

The section 13 has an end face 16 which extends radially outwardly beyond eight elongated prongs or tongues 17 which constitute the annular section 13a of the nipple 10. Those end portions (root portions) 17a of the prongs 17 which are adjacent the end face 16 are integral with the section 13 and are wider (as seen in the circumferential direction of the section 13a) than the end portions 19 at the end face 20 of the section 13a. The maximum width of a prong 17 is denoted by the character a and the minimum width of a prong is denoted by the character b. The prongs 17 alternate with wedge-like slots 18 whose width increases in a direction from the end 5 face 16 toward the end face 20, at least when the prongs 17 are not flexed by a second annular portion 12b of the nut 12. The axis of the section 13a coincides with the common axis of the sections 13 and 14.

The design of the annular section 13a is preferably such that the width of the slots 18 (in undeformed condition of the prongs 17) increases gradually in a direction from the end face 16 toward the end face 20 and the width of the prongs 17 increases gradually in a direction from the end face 20 toward the end face 16. The maximum width of the slots 18 in the region of the end face 20 of the section 13a will determine the diameter of the thinnest cable which can still be properly engaged by the prongs 17 when the prongs are flexed by the second annular portion 12b of the nut 12 while the portion 12a of the nut meshes with the annular section 13 of the nipple 10.

The illustrated prongs 17 of the section 13a include a set of four prongs 17' which alternate with a group of four prongs 17". The second end portions 19 of the prongs 17' are enlarged in the circumferential direction of the section 13a radially inwardly of the neighboring slots 18, and each such end portion extends transversely of the respective prong 17 and across the adjacent widest portions of the neighboring slots 18. Each of the end portions 19 has an arcuate shape (as considered in the circumferential direction of the section 13a) and the end portions 19 can form a circumferentially complete ring in response to sufficient flexing of the prongs 17' toward the axis of the section 13a. The reference character c denotes the distance between the radially extending surfaces 21 of the neighboring enlarged end portions 19 in undeformed condition of the prongs 17'. Each enlarged end portion 19 preferably comprises two mirror symmetrical halves with reference to a plane including the axis of the nipple 10. The end portions 19 together form a circumferentially complete ring when the width of the clearances c between the neighboring end portions 19 is reduced to zero. The lateral surfaces 21 of neighboring end portions 19 can come into actual abutment with each other simultaneously with a reduction of the outer end portions of the slots 18 to zero, i.e., when the lateral surfaces of neighboring prongs 17 abut each other. This is achieved by the annular portion 12b of the nut 12 when the latter is rotated relative to the nipple 10 and/or vice versa in a direction to advance the nut toward the collar 15 of the nipple.

Each enlarged end portion 19 has a rim or edge 22 which extends radially inwardly toward the axis of the nipple 10 and can serve as a means for releasably retaining the sealing element 11 within the confines of the annular section 13a. This may be desirable during transport of the dismantled screw coupling to the desired locale of use. The sealing element 11 can also remain within the confines of the annular section 13a during storage of the improved screw coupling.

The four prongs 17" of the group of such prongs alternate with the prongs 17' and each thereof has an enlarged intermediate portion 24 which is spaced apart from the end face 20 of the annular section 13a. The enlarged portions 24 are located radially inwardly of the neighboring slots 18 so that they can permit unimpeded flexing of the prongs 17' and 17" toward the axis of the nipple 10 in response to application of the nut 12. When the prongs 17" are sufficiently flexed, the preferably arcuate enlarged portions 24 together form a ring within the confines of the prongs 17, namely in the chamber or space 25 which is surrounded by the prongs 17' and 17". The enlarged end portions 19 and the enlarged portions 24 preferably form integral parts of the respective prongs 17' and 17". The placing of enlarged portions 19 and 24 radially inwardly of the slots 18 ensures that such enlarged portions do not interfere with flexing of the prongs in response to application of the nut 12. The flexing of the prongs is limited by the enlarged portions 19, 24 and/or by the lateral surfaces of the neighboring prongs.

In order to ensure that a cable which extends into and/or through the nipple 10 (when the improved screw coupling is in actual use) will be properly engaged by the annular section 13a even if the diameter of the cable is such that its peripheral surface cannot be properly engaged by the enlarged end portions 19 and-/or enlarged portions 24, the prongs 17" are preferably provided with elongated projections 29 each of which preferably exhibits a triangular cross-sectional outline with its apex nearest to the common axis of the sections 13, 13a and 14. The projections 29 assist the end portions 19 to adequately compress the entire or the major part of the sealing element 11 into engagement with the peripheral surface of the cable in the nipple 10 even if the sealing element cannot be properly engaged and deformed by the end portions 19 of the prongs 17' alone. The radially innermost portions of the rims 22 on the enlarged end portions 19 and the projections 29 of the prongs 17" preferably form a circle the center of which is located on the axis of the nipple 10.

It will be readily appreciated that the number of prongs which form the section 13a can be increased above eight or reduced to less than eight. All that counts is to ensure that the prongs can properly deform the sealing element 11 or that they can properly engage the periphery of the confined cable in response to application of the nut 12 over the sections 13 and 13a. It is also possible to distribute the prongs 17' and 17" in a different way, as long as the prongs ensure adequate deformation of the sealing element 11. It has been found that the illustrated arrangement with an even number of prongs 17, and with the enlarged end portions 19 alternating with the enlarged portions 24, as considered in the circumferential direction of the section 13a, is quite satisfactory for a number of different uses.

The reference character 28 denotes that end face of the nut 12 which faces away from the collar 15 when the nut is applied to the nipple 10 so that its portion 12a mates with the section 13 of the nipple. The end face 28 may but need not surround an opening in the nut 12. Thus, the nut 12 may but need not always be provided with an axial passage which extends all the way between its end faces. This depends upon the position of the cable within the confines of the nippled 10. If the end face of the confined cable is located inwardly of the end face 20 of the section 13a, the end face 28 of the nut 12 need not have a centrally located opening. As a rule, the cap nut 12 will constitute a tubular body with a through passage. The utilization of a nut which constitutes a tubular body is desirable and advantageous on the additional ground that it facilitates the manipulation of a cable which is to be inserted into, held in or extracted from the nipple 10.

The manipulation of the improved screw coupling will be readily appreciated upon perusal of the preceding disclosure. Thus, the cable is inserted into the nipple 10 before the nut 12 is caused to mate with the section 13 of the nipple to such an extent that the prongs 17 of the section 13a move into pronounced frictional engagement with the sealing element 11 or directly with the periphery of the confined cable. The sealing element 11 is preferably provided with an external annular shoulder 23 which abuts the rims 22 of the prongs 17' so as to ensure that the sealing element 11 is held in an optimum axial position with reference to the nipple 10. The enlarged portions 19 and 24 engage the sealing element 11 at different levels, as considered in the axial direction of the nipple 10. When the application of the nut 12 is completed, the prongs 17 cooperate with the sealing element 11 to hold the confined cable in a selected axial position. The coupling can serve to ensure proper sealing of the space between the periphery of the confined cable and the sealing element 11 so as to prevent leakage of liquids and/or gases along the periphery of the cable, as well as to hold the cable in a selected axial position and to relieve axial stresses upon the confined cable. The extent of flexing of the prongs 17 under the action of the annular portion 12b of the nut 12 will determine the force with which the confined cable is held in the nipple 10. Moreover, the extent to which the nut 12 is advanced toward the collar 15 of the nipple 10 will determine the extent of flexing of the prongs 17 and hence the magnitude of the force with which the cable is held against axial movement. The versatility of the improved screw coupling is sufficient to ensure that it can properly hold smaller-diameter as well as larger-diameter cables with the same or with a similar degree of reliability.

The areas of the internal surfaces of the enlarged portions 19 and 24 are preferably selected in such a way that the sealing element 11 is in large surface-to-surface contact with the annular section 13a of the nipple 10. This ensures reliable retention of the cable in a selected axial position as well as reliable sealing of the space between the periphery of the cable and the internal surface of the sealing element 11. The feature that the width of the slots 18 increases in a direction from the end face 16 toward the end face 20 enhances the versatility of the screw coupling because the coupling can properly hold large- or small-diameter cables. Moreover, the enlarged portions 19 and 24 do not interfere with flexing of the prongs 17 because they are located radially inwardly of the slots 18.

As mentioned above, the improved screw coupling is susceptible of many additional modifications without departing from the spirit of the invention. This applies particularly for the configuration of the prongs 17 and/or their enlarged portions 19, 24, for the number of prongs, for the distribution of prongs 17' and 17" as well as for the configuration and dimensions of the projections 29. In addition, the improved screw coupling can be put to many additional uses regardless of the exact configuration, dimensions and/or purpose of the elongated bodies which are to be introduced into and held in the nipple 10.

The configuration of the wedge-like slots 18 can be selected in such a way that the minimum width of the slots in the region of the end face 16 of the externally threaded annular section 13 equals or approximates zero. All that counts is to ensure that the width of the slots 18 increases in a direction from the end face 16 toward the end face 20 in undeformed condition of the prongs 17 or that the minimum width of the slots 18 in the region of the end face 20 is selected with a view to allow for requisite flexing of the prongs relative to the axis of the nipple 10. The maximum width of the slots 18 in the region of the end face 20 can be selected in such a way that it enhances the versatility of the improved screw coupling. This is possible because the prongs 17' and 17" are respectively provided with the enlarged portions 19 and 24 which can properly engage the sealing element 11 and/or the periphery of the cable in the nipple 10, even if the width of the slots 18 in the region of the end face 20 is not reduced to zero. As mentioned above, the dimensions of the enlarged portions 19 and/or 24 can be readily selected in such a way that the enlarged portions are in large-area contact with the sealing element 11 or with the periphery of the cable. The diameter of the opening defined by the ring which is formed by the enlarged portions 19 and/or 24 when the neighboring enlarged portions 19 and/or 24 abut each other is preferably slightly less than the diameter of the confined cable. This ensures the establishment of a reliable sealing or retaining engagement with the element 11 or the confined portion of the cable.

The making of the nipple 10 from a single piece of suitable plastic material contributes to lower cost of the nipple and of the entire screw coupling. Thus, the screw coupling need not consist of more than three parts and it can consist of only two parts (nipple and nut) if the sealing element 11 is not absolutely necessary.

The projections 29 constitute an optional feature of the nipple 10. The provision of such projections is desirable and advantageous because they contribute to more uniform distribution of sealing and retaining forces when the prongs 17 are flexed by the portion 12b of the nut 12. Uniform distribution of stresses is ensured if the projections 29 and the radially innermost portions or rims 22 of the enlarged end portions 19 form a circle with a center on the axis of the nipple 10. The projections 29 can compensate for unavoidable angular distortion of the clamped portions of the sealing element 11 in response to flexing of the outer end portions of the prongs 17 due to application of the nut 12.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A screw coupling, particularly for surrounding cables, hoses, conduits, conductors and like bodies, comprising a nipple including an externally threaded first annular section and a second annular section fast with said first section and having an end face remote from said first section, said second section including a set of flexible prongs having first end portions at said first section and second end portions at said end face, and slots alternating with said prongs, the width of said prongs as measured circumferentially of said second section decreasing in a direction from said first section toward said end face, and said second end portions being enlarged and extending circumferentially of said second section and transversely of the neighboring slots; and a nut having a first internally threaded annular portion arranged to mate with said first section and a second annular portion having an inside diameter smaller than the maximum outside diameter of said second section so that said second annular portion can flex said prongs and thereby move at least the second end portions of the prongs nearer to the axis of said second section in response to rotation of said nut in a direction to thread said first portion onto said first section.

2. The coupling of claim 1, further comprising a substantially tubular deformable sealing element receivable within the confines of said second section so as to undergo deformation in response to flexing of said prongs toward the axis of said second section.

3. The coupling of claim 1, wherein the enlarged second end portion of each prong of said set of prongs extends transversely of and across the neighboring slots.

4. The coupling of claim 3, wherein the enlarged second end portion of each prong of said set of prongs has two substantially mirror symmetrical halves.

5. The coupling of claim 1, wherein said second section further includes a group of prongs which alternate with the prongs of said set.

6. The coupling of claim 1, wherein said prongs have lateral surfaces flanking said slots and the lateral surfaces of neighboring said prongs abut each other in response to a predetermined maximum flexing of the prongs toward the axis of said second section.

7. The coupling of claim 1, wherein said second section further includes a group of prongs having enlarged portions disposed between said end face and said first section and extending circumferentially of said second section and transversely of said slots.

8. The coupling of claim 7, wherein said second section includes an even number of prongs and the prongs of said set alternate with the prongs of said group.

9. The coupling of claim 7, wherein the enlarged portion of at least one prong of said group has an arcuate shape in the circumferential direction of said second section.

10. The coupling of claim 7, wherein the enlarged portions of said group of prongs have an arcuate shape in the circumferential direction of said second section and together form a ring in response to predetermined flexing of the prongs of said group toward the axis of said second section.

11. The coupling of claim 1, wherein at least one of said enlarged second end portions has an arcuate shape in the circumferential direction of said second section.

12. The coupling of claim 1, wherein the enlarged second end portions of said set of prongs have an arcuate shape in the circumferential direction of said second section and together form a ring in response to predetermined flexing of the prongs of said set toward the axis of said second section.

13. The coupling of claim 1, wherein said second section further includes a group of prongs which alternate with the prongs of said set and have projections extending substantially radially inwardly toward the axis of said second section.

14. The coupling of claim 1, wherein said second section further includes additional prongs which have projections extending substantially radially inwardly toward the axis of said second section.

15. The coupling of claim 14, wherein at least one of said projections has a substantially triangular cross-sectional outline with an apex nearest to the axis of said second section.

16. The coupling of claim 14, wherein the second end portions of said set of prongs have radially innermost portions forming a circle with the projections of said additional prongs.

17. The coupling of claim 1, wherein the mating threads of said first section and said first annular portion are buttress threads.

18. The coupling of claim 1, wherein at least said nipple contains a plastic material.

19. The coupling of claim 1, wherein said nipple has a collar adjacent said first section, said first section being disposed between said collar and said second section and said collar having at least one flat to facilitate rotation of the nipple by a torque transmitting tool.

20. The coupling of claim 1, wherein said enlarged end portions are disposed radially inwardly of the neighboring slots.

21. The coupling of claim 1, wherein said second section is of one piece with said first section.

* * * * *